United States Patent [19]
Eidenschink

[11] Patent Number: 5,824,403
[45] Date of Patent: Oct. 20, 1998

[54] ELECTROSTATICALLY COATED PULTRUSIONS AND METHODS OF MAKING

[75] Inventor: Amy C. Eidenschink, Rogers, Minn.

[73] Assignee: Pella Corporation, Pella, Iowa

[21] Appl. No.: 632,243

[22] Filed: Apr. 15, 1996

[51] Int. Cl.$^6$ ...................................................... B32B 5/06
[52] U.S. Cl. .................................. 428/300.4; 428/298.1; 428/298.7; 428/299.4; 427/458; 427/532
[58] Field of Search ..................... 428/375, 392, 428/394, 395, 396, 298.1, 298.7, 299.4, 300.4; 427/458, 532

[56] References Cited

U.S. PATENT DOCUMENTS 4,816,331  3/1989  Rau et al. ................................ 428/294

*Primary Examiner*—Christopher Raimund
*Attorney, Agent, or Firm*—Hovey, Williams, Timmons & Collins

[57] ABSTRACT

Electrostatically coated synthetic resin pultrusions (10) are provided in the form of elongated bodies presenting ends, with a series of elongated, spaced apart conductive elements (16) embedded within the pultruded bodies. Electrical coupling means (18) preferably in the form of a conductive primer is applied to the one end (14) of the pultrusion (10) prior to electrostatic coating in order to eliminate arcing problems. Alternately, a pultrusion may be provided having a section free of embedded elements with one or more sections having conductive elements therein.

39 Claims, 2 Drawing Sheets

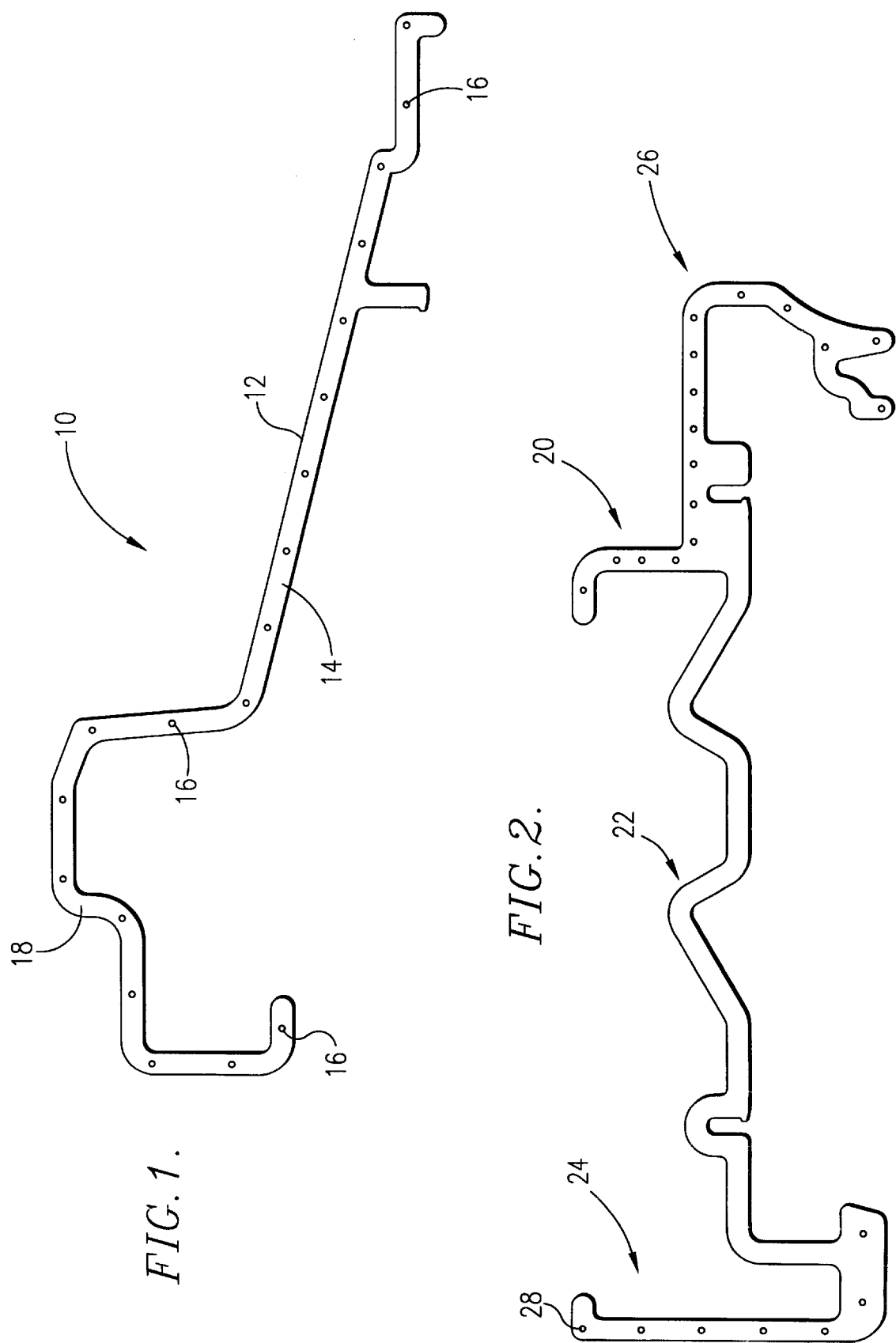

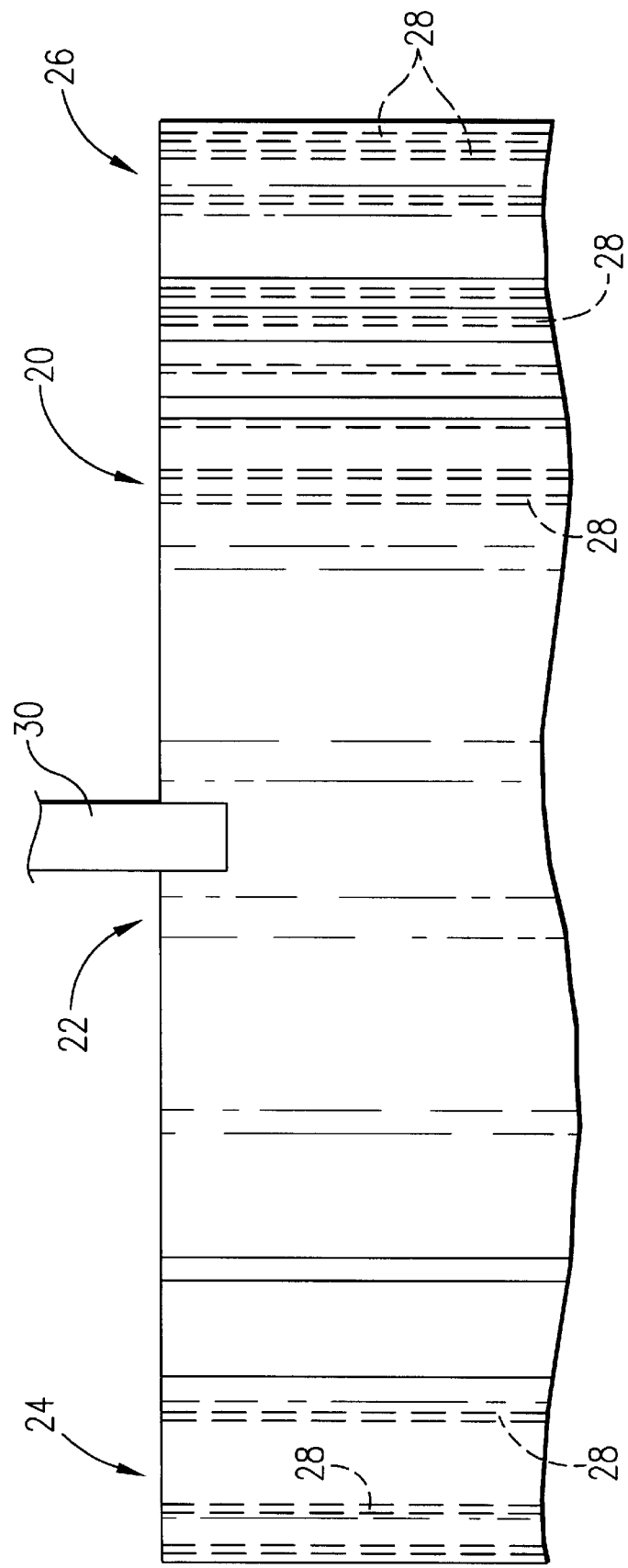

ELECTROSTATICALLY COATED PULTRUSIONS AND METHODS OF MAKING

BACKGROUND OF THE INVENTION

1. Field of the Invention

The present invention is broadly concerned with improved synthetic resin pultrusions suitable for electrostatic coating, finished coated pultrusions, and methods of coating such items. The invention finds particular utility in the coating of pultruded window and door components, but the methods of the invention can be adapted for the electrostatic coating of virtually any type of pultrusion. In particular, it has been discovered that pultrusions having a plurality of elongated conductive elements embedded therein can be most effectively electrostatically coated by initially applying means to at least one end of the pultruded body for electrically coupling the internal conductive elements; in this fashion, arcing during the electrostatic coating process is essentially eliminated. In other embodiments, only selected portions of a pultrusion are provided with embedded conductive elements, and strategic location of these elements can itself eliminate arcing problems without the need for electrical coupling of the embedded elements.

2. Description of the Prior Art

Pultrusion is a process for producing elongated synthetic resin articles by pulling a resin-impregnated fiber reinforcement through a forming and curing die. Pultrusion has been used to fabricate a wide variety of elongated articles such as fishing rods, hot line equipment for the electrically utility industry, ladders, gratings and handrails. Normally, pultruded products are painted or coated after fabrication, and a variety of resin-based coating systems have been proposed and tested.

U.S. Pat. No. 4,816,331 describes pultruded articles which include conductive metal wires or glass rovings embedded within the articles so as to form conductive paths therein. These types of pultrusions can then be coated using otherwise conventional electrostatic coating techniques. Attempts at electrostatically coating pultruded articles in accordance with the teachings of the '331 patent have proven to be unsatisfactory. A primary difficulty stems from arcing problems encountered during continuous line coating operations, which present safety hazards.

There is accordingly a need in the art for improved electrostatically coated pultrusions and methods of coating thereof which overcome the arcing problem of prior techniques.

SUMMARY OF THE INVENTION

The present invention overcomes the problems outlined above and provides pultrusion suitable for electrostatic coating on a production line basis. Broadly, the pultrusions of the invention are in the form of elongated, pultruded bodies presenting opposed ends and having a plurality of elongated, spaced apart, conductive elements embedded therein and extending along the lengths of the bodies between the opposed ends to define respective conductive paths. In one embodiment, the pultrusions of the invention are modified with means at one end thereof for electrically coupling the adjacent ends of the embedded conductive elements. It has been found that this virtually eliminates arcing problems during electrostatic coating.

One end of the pultruded bodies of the invention can be modified by the application of a conductive fluid (e.g., paint, primer, adhesive, gel, water or prep solution) or by the use of externally applied conductive tapes or foils. In some cases, it is only necessary to apply conductive means to a butt end of the pultruded body; in other cases though, it may be desirable to apply the conductive means to portions of the axial surfaces of the bodies adjacent the modified butt end. This is particularly important if the pultruded bodies are to be secured by hangers or the like for travel through an electrostatic line coating operation, i.e., the portions of the bodies contacted by the hangers should also have conductive means applied thereto, and the hangers should be appropriately grounded. Where a conductive coating is employed, it is preferred that it be selected from the group consisting of the polyurethanes, polyesters, acrylics, and blends of the foregoing.

In other embodiments, it has been found that only certain portions of a pultruded body need to have conductive elements embedded therein. In such cases, the pultrusion are designed so that the coating line hangers engage segments of the pultrusions not having conductive elements therein and in sufficiently spaced relationship to the conductive elements so as to eliminate arcing. In such cases, there is no need for conductive primer or other such expedient at the butt end of the pultrusion.

In preferred forms, the pultruded bodies or the invention are formed of glass-reinforced polyester having conductive metallic elements embedded therein. In those instances where a conductive primer or the like is employed, the ends of such pultruded bodies engaged by a coating line hanger are advantageously coated with a carbon-filled conductive primer. Such coated bodies are then suitable for electrostatic application of a synthetic resin coating, e.g., a modified polyester coating.

BRIEF DESCRIPTION OF THE DRAWINGS

FIG. 1 is an end view illustrating a window sill pultrusion in accordance with the invention wherein the pultrusion includes embedded conductive elements through the entirety thereof and is adapted to have a conductive primer applied to one end of the pultrusion;

FIG. 2 is an end view illustrating another window part pultrusion wherein only selected portions of the pultrusion are provided with embedded conductive elements, and wherein the location of the embedded elements permits electrostatic coating of the pultrusion without the need for application of a conductive primer; and FIG. 3 is a fragmentary, side elevational view of the window part pultrusion of FIG. 2 wherein a coating line hanger engages and supports the pultrusion at the central region thereof which is entirely free of conductive elements.

DETAILED DESCRIPTION OF THE PREFERRED EMBODIMENT

Turning now to FIG. 1, an elongated window frame element pultrusion 10 is illustrated. The pultrusion 10 comprises an elongated synthetic resin body 12 presenting a pair of opposed ends 14. The pultrusion 10 also includes a plurality of spaced apart, electrically conductive aluminum wire elements 16 extending the full length of the body 12 and terminating at the ends 14. One end of the pultrusion 10 is provided with electrically conductive means in the form of a conductive primer coating 18 serving to electrically couple the elements 16. In the form illustrated, the pultrusion 10 would typically have a thickness in the range of from about 0.075 to 0.083 inches.

In preferred forms, the synthetic resin body 12 is formed from resin systems such as the polyesters, formaldehyde resins (e.g., urea-formaldehyde, melamine-formaldehyde, analine-formaldehyde, ethylene urea-formaldehyde, benzoquanamine-formaldehyde and phenol-formaldehyde), epoxies, polyalkylenes (e.g., polyethylene, polypropylene, polystyrene), polyvinyl chloride, polyphenylene oxides, polysulfones, polycarbonates, polyurethanes, polyacrylates (e.g., polymethyl methacrylate, polymethyl acrylate), polyacetyls and mixtures thereof.

As is conventional with pultrusion formulations, the synthetic resin matrix is provided with non-conductive filament elements, usually fibrous glass. However, a variety of such filament elements can be employed such as those selected from the group consisting of glass, nylon, orion, rayon, dacron, naturally occurring fibers, and mixtures thereof. Normally, the non-conductive fiber loading would be from about 25–75% by weight.

In particularly preferred forms, a polyester pultrusion system is employed. This is a commercially available system in the form of an isophthalic polyester containing calcium carbonate filler and a glass fiber loading of 55–60% by weight.

The conductive elements 16 are advantageously formed from a material selected from the group consisting of aluminum, copper, steel and conductive coated glass roving; conductive coated synthetic rovings and carbon rovings where metal wires are used, the diameter would normally range from about 0.005–0.070 inches. In preferred forms, the conductive elements are made of 0.012 inch diameter aluminum wire. As indicated in FIG. 1, the elements 16 are spaced apart and extend from end-to-end through the body 12. In this connection, the conductive elements are preferably placed from about ⅛–1 inch apart within the body 12, and most preferably about ¼ inch apart. In the illustrated pultrusion, nineteen individual, axially extending conductive elements are used which are equally spaced as shown. Generally, the conductive elements 16 are located no more than about 4 inches below a surface of the body 12 to be electrostatically coated, although the depth of the elements 16 is generally not a critical issue. Normally, the elements 16 would be placed immediately below the surface(s) to be electrostatically coated (e.g., from about 0.010–0.070 inches below such surface(s)), and more preferably about 0.030 inches below the surfaces. Essentially any placement depth for the element 16 is acceptable so long as the elements 16 are fully embedded within the reinforced synthetic resin matrix.

The conductive means 18 is preferably selected from the group consisting of conductive liquids such as water, coatings, and prep solutions, adhesives, gels, tapes and foils, with conductive coatings being used normally. In practice, the conductive coating is a carbon black-filled air dry acrylic primer.

The preferred material is obtained from Morton International under the designation "Airdry Conductive Primer", which includes 15% by weight carbon black. The coating is conventionally applied to the one end 14 of the body 12 by brushing or spraying. In addition, in order to further reduce the risk of arcing during electrostatic coating, it is normally desirable to coat an axial length of the body 12 adjacent the coated end 14 in the region thereof engaged by pickup or holding equipment used during the final coating process. That is, it is preferred that the elongated pultrusions of the invention be coated on a continuous line basis while being held vertically from one end thereof. This entails use of movable hangers which support the individual pultrusions. In such a case, it is desirable to conductively coat those regions of the pultrusion engaged by the hanger apparatus with the conductive primer material.

The pultrusions in accordance with the invention can be electrostatically coated to provide a desired color finish. A variety of different types of coatings can be used, such as those selected from the group consisting of the polyesters, urethanes and acrylics. The most preferred final coating is a white polyester enamel sold by Morton Industrial Coatings under the designation "Polyceram 2000". In coating operations, the pultrusions are suspended using appropriate hangers and are passed in serial order through a coating line. In the first step, the pultrusions are cleaned using a 60 second spray of dilute sodium hydroxide at 148° F., followed by two water rinses of 60 second duration using ambient temperature tap water, and a final 30 second rinse using deionized water. The rinsed pultrusions are then dried in a convection oven (200° F., 10 minutes) and allowed to air cool to room temperature (about 14 minutes). The pultrusions are then subjected to a heating step (18 minutes, 270° F.) and allowed to cool to room temperature over a period of about 15 minutes. At this point, the polyester coating is electrostatically applied using a conventional reciprocating disk applicator (15–18 rpm, a 65–120 kV voltage for field generation, at an application rate of 220–1,000 cc/min.) to give a wet film thickness of from about 0.7–4.1 mil. After electrostatic application, the coating is allowed to flash for 10 minutes at room temperature. The coating is then baked for about 18 minutes at a temperature of from about 300°–370° F. (most preferably about 340° F.), with subsequent cooling at room temperature for about 22 minutes. The final coating has a dry film thickness of from about 0.3–7 mils, and more preferably from about 0.5–3 mils. It will of course be understood that the foregoing process details are not essential and may be varied as required, in light of a particular product or coating operation.

FIG. 2 illustrates another type of pultrusion 20 having a central region 22 and respective side marginal regions 24, 26. Each of the regions 24, 26 is provided with a series of elongated, axially extending conductive elements 28 embedded therein, which are placed and oriented as described with reference to FIG. 1. However, it will be observed that the central region 22 is entirely free of conductive elements. It has been found that electrostatically coating of pultrusions such as seen in FIG. 2 can be accomplished without the need for a conductive primer or other means of electrically connecting the respective elements 28. In such instances, the coating line hangers 50 engage the pultrusion 20 at the central region 22, and the hanger structure is sufficiently spaced from the elements 28 to prevent arcing as shown in FIG. 3. Preferably, the region of the pultrusion 20 free of conductive elements should have a width of at least about 1 inch, and preferably a width of from about 1–4 inches. In all other details, the pultrusions in accordance with FIG. 2 are described with reference to the FIG. 1 embodiment.

Fabrication of pultrusions in accordance with the invention provides superior end products which are essentially free of coating imperfections. At the same time, the dangerous arcing phenomenon during electrostatic coating is essentially entirely suppressed.

I claim:

1. A pultrusion suitable for electrostatic coating and comprising an elongated, synthetic resin, pultruded body presenting a pair of ends with a plurality of elongated, spaced apart conductive elements embedded in said body and extending along the length thereof between said ends to define respective conductive paths, and means for electrically coupling said conductive elements at one of said ends, said electrical coupling means being selected from the group consisting of conductive coatings, adhesives, gels, water, tapes and foils.

2. The pultrusion of claim 1, said pultruded body having a plurality of non-conductive filament elements embedded therein.

3. The pultrusion of claim 1, said synthetic resin being selected from the group consisting of the polyesters, formaldehyde resins, epoxies, polyalkylenes, polyvinyl chloride, polyphenylene oxides, polysulfones, polycarbonates, polyurethanes, polyacrylates, polyacetyls, and mixtures thereof.

4. The pultrusion of claim 3, said resin being a polyester resin.

5. The pultrusion of claim 1, said synthetic resin being filled.

6. The pultrusion of claim 1, said synthetic resin having a plurality of non-conductive filament elements therein selected from the group consisting of glass, nylon, orlon, rayon, dacron, naturally occurring fibers, and mixtures thereof.

7. The pultrusion of claim 1, said conductive elements being formed of material selected from the group consisting of aluminum, copper, steel and conductive coated glass roving.

8. The pultrusion of claim 7, said conductive elements being formed of aluminum.

9. The pultrusion of claim 1, said conductive elements being located no more than about 4 inches below a surface of said body to be coated.

10. The pultrusion of claim 1, said conductive elements being placed from about $1/16-1$ inch apart within said body.

11. The pultrusion of claim 10, said conductive elements being placed about $1/4$ inch apart within said body.

12. The pultrusion of claim 1, said electrical coupling means being a conductive coating.

13. An electrostatically coated pultrusion comprising an elongated, synthetic resin, pultruded body presenting a pair of ends with a plurality of elongated, spaced apart conductive elements embedded in said body and extending along the length thereof between said ends to define respective conductive paths, means at one of said ends for electrically coupling said conductive elements, and an electrostatically applied coating on at least one surface of said body, said electrical coupling means being selected from the group consisting of conductive coatings, adhesives, gels, water, tapes and foils.

14. The pultrusion of claim 13, said pultruded body having a plurality of non-conductive filament elements embedded therein.

15. The pultrusion of claim 13, said synthetic resin being selected from the group consisting of the polyesters, formaldehyde resins, epoxies, polyalkylenes, polyvinyl chloride, polyphenylene oxides, polysulfones, polycarbonates, polyurethanes, polyacrylates, polyacetyls, and mixtures thereof.

16. The pultrusion of claim 15, said resin being a polyester resin.

17. The pultrusion of claim 13, said synthetic resin being filled.

18. The pultrusion of claim 13, said synthetic resin having a plurality of non-conductive filament elements therein selected from the group consisting of glass, nylon, orlon, rayon, dacron, naturally occurring fibers, and mixtures thereof.

19. The pultrusion of claim 13, said conductive elements being formed of material selected from the group consisting of aluminum, copper, steel and conductive coated glass roving.

20. The pultrusion of claim 19, said conductive elements being formed of aluminum.

21. The pultrusion of claim 13, said conductive elements being located no more than about 4 inches below a surface of said body to be coated.

22. The pultrusion of claim 13, said conductive elements being placed from about $1/16-1$ inch apart within said body.

23. The pultrusion of claim 22, said conductive elements being placed about $1/4$ inch apart within said body.

24. The pultrusion of claim 14, said electrical coupling means being a conductive coating.

25. The pultrusion of claim 13, said electrostatically applied coating being selected from the group consisting of the polyurethanes, polyesters, acrylics and blends of the foregoing.

26. The pultrusion of claim 23, said coating being a polyester.

27. The pultrusion of claim 13, said electrostatically applied coating having a thickness of from about 0.3–7 mils.

28. The pultrusion of claim 27, said thickness being from about 0.5–3 mils.

29. The pultrusion of claim 13, all of the outer surface of said body being electrostatically coated.

30. A method of electrostatically coating an elongated pultruded synthetic resin body presenting a pair of ends and having a plurality of elongated, spaced apart, conductive elements embedded within the body and extending along the length thereof between said ends, including the steps of applying to one of said body ends conductive means for electrically coupling said conductive elements, and thereafter electrostatically coating at least one surface of said body, said electrical coupling means being selected from the group consisting of conductive coatings, adhesives, gels, water, tapes and foils.

31. The method of claim 30, wherein said applying steps comprises the step of coating said one end with a conductive primer.

32. The method of claim 31, said conductive primer comprising a carbon-loaded synthetic resin primer.

33. A pultrusion suitable for electrostatic coating and comprising an elongated, synthetic resin, pultruded body presenting a pair of opposed ends and at least one elongated section having embedded therein a series of elongated, spaced apart conductive elements extending along the length of the section between said ends to define respective conductive paths, there being at least one other section of said pultrusion which is free of said embedded elements, the width of said other section being substantially greater than the linear width interval between adjacent ones of said embedded elements of said series, and said other section being adapted for engagement and support by a hanger apparatus utilized in a line coating operation.

34. The pultrusion of claim 33, said width of said other section free of said embedded elements being from about 1–4 inches.

35. The pultrusion of claim 33, said other section free of said embedded elements being centrally located between a pair of side marginal sections on opposite sides of said other section, each of said side marginal sections having said conductive elements embedded therein.

36. The pultrusion of claim 33, the width of said other section free of said embedded elements being substantially greater than the width of said one section.

37. A combination comprising:
 a pultrusion suitable for electrostatic coating and comprising an elongated, synthetic resin, pultruded body presenting a pair of opposed ends and at least one elongated section having embedded therein a series of elongated, spaced apart conductive elements extending along the length of the one section between said ends to define respective conductive paths, there being at least one other section of said pultrusion which is free of said embedded elements, the width of said other section being substantially greater than the linear width interval between adjacent ones of said embedded elements of said series; and a hanger apparatus operatively engaging and supporting said pultrusion, said hanger engaging said other section of said pultrusion in spaced relationship to said embedded elements in the one section.

38. The combination of claim 37, said other section free of embedded elements being centrally located between a pair of side marginal sections on opposite sides of said other section, each of said side marginal sections having said conductive elements embedded therein.

39. The combination of claim 37, the width of said other section free of embedded elements being substantially greater than the width of said one section.

* * * * *